United States Patent
Gonzalez et al.

(10) Patent No.: US 10,207,793 B2
(45) Date of Patent: Feb. 19, 2019

(54) ROTOR BLADE HAVING VARIABLE TWIST

(71) Applicant: Bell Helicopter Textron Inc., Fort Worth, TX (US)

(72) Inventors: Eric R. Gonzalez, Fort Worth, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 575 days.

(21) Appl. No.: 15/365,061

(22) Filed: Nov. 30, 2016

(65) Prior Publication Data

US 2018/0148160 A1 May 31, 2018

(51) Int. Cl.
| | |
|---|---|
| *B64C 11/18* | (2006.01) |
| *B64C 27/467* | (2006.01) |
| *B64C 27/35* | (2006.01) |
| *B64C 27/52* | (2006.01) |
| *B64C 27/473* | (2006.01) |
| *B64C 11/20* | (2006.01) |
| *B64C 29/00* | (2006.01) |

(52) U.S. Cl.
CPC .............. *B64C 11/18* (2013.01); *B64C 11/20* (2013.01); *B64C 27/35* (2013.01); *B64C 27/467* (2013.01); *B64C 27/473* (2013.01); *B64C 27/52* (2013.01); *B64C 29/0033* (2013.01)

(58) Field of Classification Search
CPC ......... B64C 11/18; B64C 11/20; B64C 27/35; B64C 27/52; B64C 27/467; B64C 27/473; B64C 29/0033
See application file for complete search history.

(56) References Cited

U.S. PATENT DOCUMENTS

| | | | |
|---|---|---|---|
| 4,324,530 A | 4/1982 | Fradenburgh et al. | |
| 6,497,385 B1 * | 12/2002 | Wachspress | B64C 27/28 244/17.11 |
| 6,499,952 B1 | 12/2002 | Jacot et al. | |
| 6,616,095 B2 * | 9/2003 | Stamps | B64O 27/08 244/17.13 |

(Continued)

OTHER PUBLICATIONS

Mark W. Nixon, "Improvements to Tilt Rotor Performance Through Passive Blade Twist Control," Apr. 1988, 11 pages, NASA Technical Memorandum 100583.

(Continued)

*Primary Examiner* — Patrick Hamo
(74) *Attorney, Agent, or Firm* — Timmer Law Group, PLLC

(57) ABSTRACT

A rotor blade including a root portion adapted to be connected to a helicopter rotor hub for rotation therewith, the root portion having a first edge surface; a first movable member having a first movable surface adjacent to the first edge surface; a first elastomeric joint disposed between the root portion and the first movable member, the first elastomeric joint having an inner surface facing the first edge surface of the root portion and an outer surface facing the movable surface of the first movable member; and an actuating system mounted within the root portion and the first movable member for moving the first movable member. The first elastomeric joint deforms to adjust for shear from actuation of the first movable member to a first position during helicopter mode; and to a second position during airplane mode.

21 Claims, 9 Drawing Sheets

(56) References Cited

U.S. PATENT DOCUMENTS

| | | | |
|---|---|---|---|
| 7,594,625 B2 * | 9/2009 | Robertson | B64O 11/16 244/70 |
| 7,857,598 B2 | 12/2010 | McGeer et al. | |
| 8,287,237 B2 | 10/2012 | Stamps et al. | |
| 8,662,843 B2 | 3/2014 | Brunken, Jr. | |
| 9,156,237 B2 | 10/2015 | Sottiaux et al. | |
| 9,197,274 B2 | 11/2015 | Mack et al. | |
| 9,347,487 B2 | 5/2016 | Anderson et al. | |
| 9,399,512 B2 | 7/2016 | Davis et al. | |
| 2006/0239824 A1 * | 10/2006 | Robertson | B64O 11/16 416/231 B |
| 2013/0062456 A1 | 3/2013 | McCollough et al. | |
| 2013/0084186 A1 | 4/2013 | Sottiaux et al. | |
| 2014/0301856 A1 | 10/2014 | Oldroyd et al. | |
| 2015/0104307 A1 | 4/2015 | Foskey et al. | |
| 2015/0104314 A1 * | 4/2015 | Zamponi | B64O 27/72 416/134 A |
| 2016/0052627 A1 | 2/2016 | Piechowicz | |
| 2016/0075430 A1 | 3/2016 | Foskey et al. | |
| 2016/0122011 A1 | 5/2016 | Bagai | |
| 2016/0169031 A1 | 6/2016 | Vorzobov | |

OTHER PUBLICATIONS

A. Buter, et al, "Adaptive Rotor Blade Concepts—Direct Twist and Camber Variation," German Aerospace Center, Institute of Structural Mechanics, 11 pages.

* cited by examiner

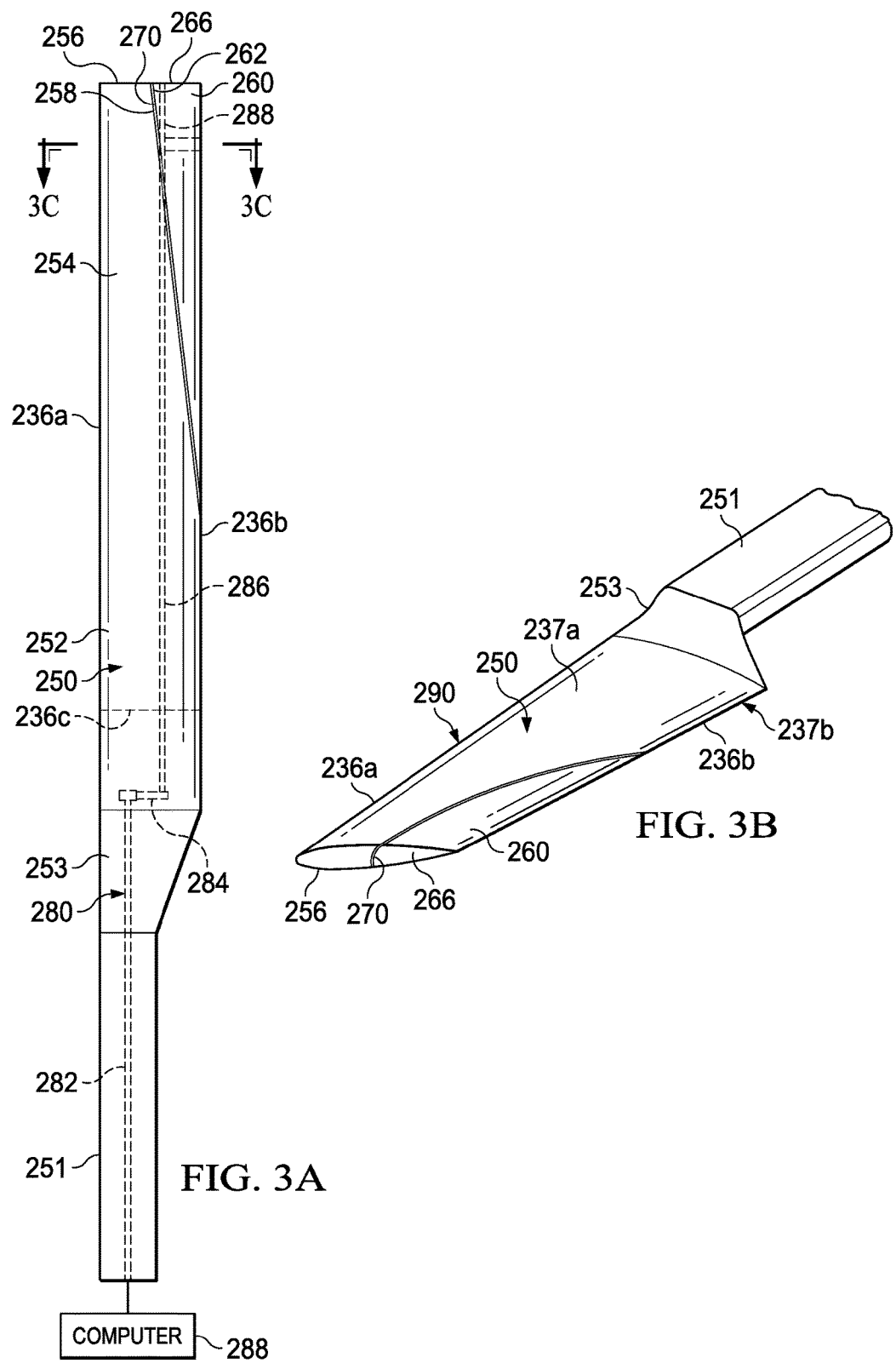

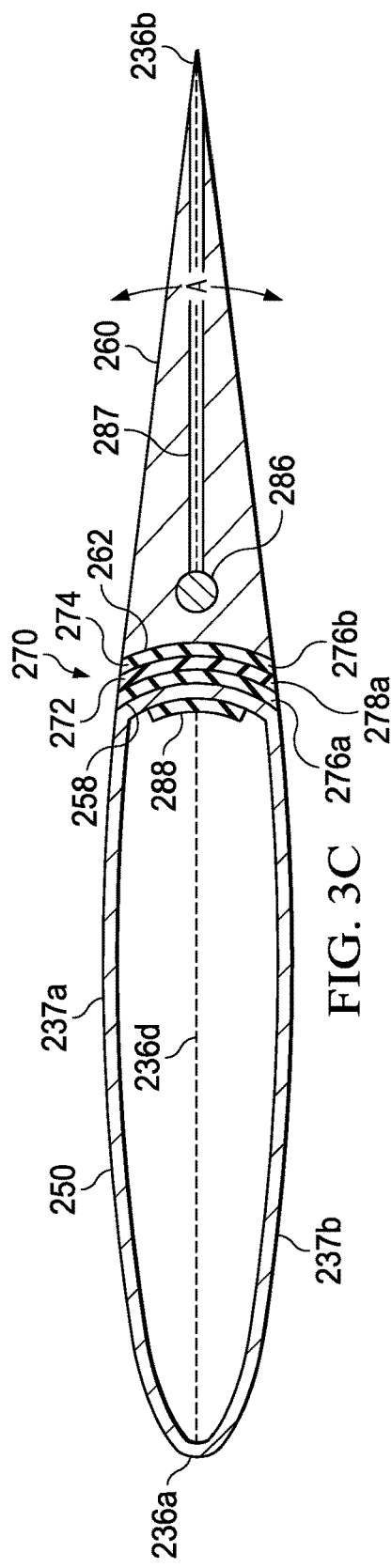

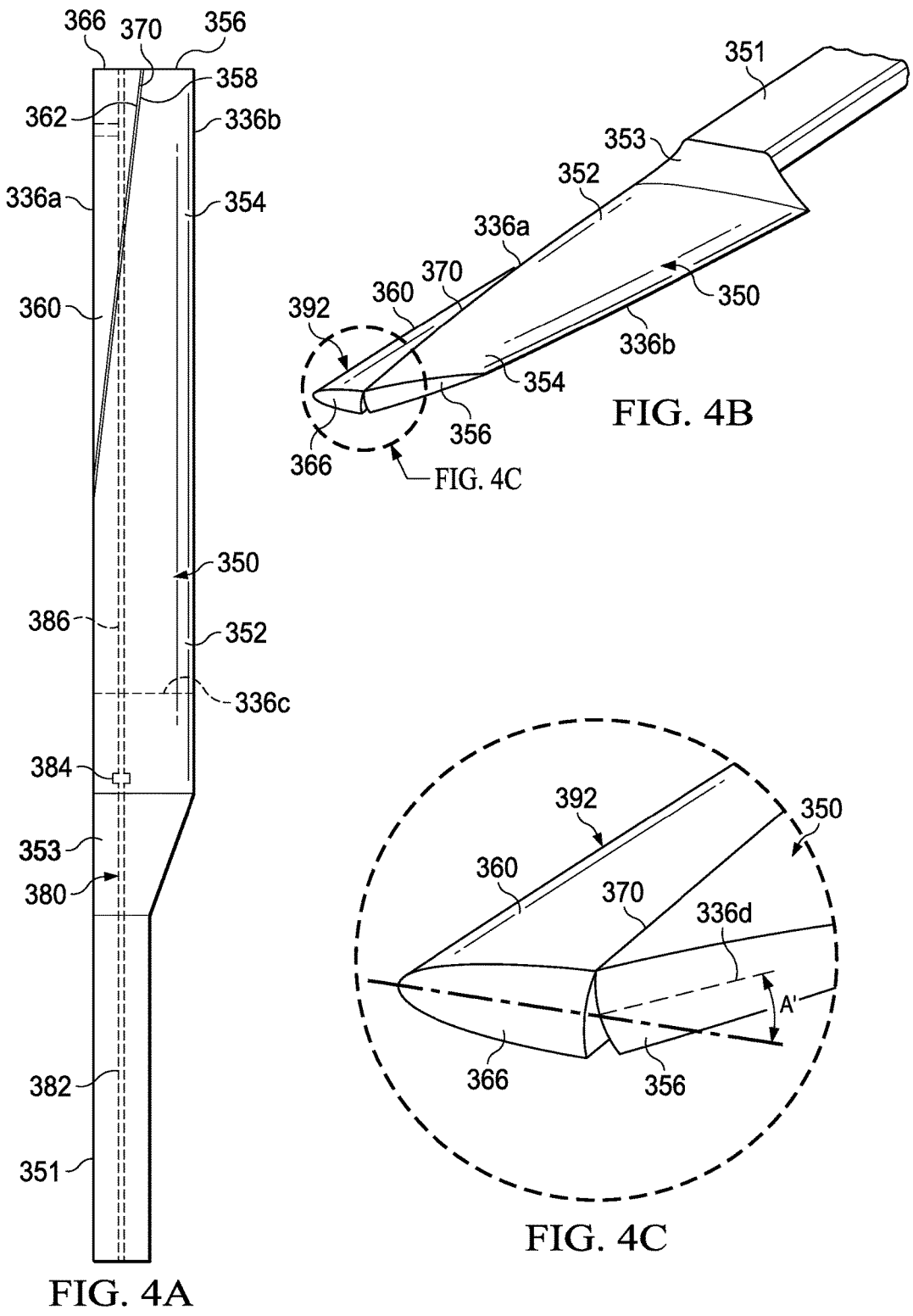

ROTOR BLADE HAVING VARIABLE TWIST

BACKGROUND

Technical Field

The present disclosure relates to a blade for an aircraft, and more particularly, to a variable twist rotor blade with an elastomeric joint.

Description of Related Art

One example of an aircraft is a tiltrotor. A tiltrotor aircraft may operate in a helicopter mode by positioning the nacelles upright and in an airplane mode by positioning the nacelles forward. Each propulsion system within a nacelle includes at least one rotor, a gearbox, and a power source. The rotor has a plurality of rotor blades that must operate over a wide range of speeds and angles in a variety of atmospheric conditions. One example of a tiltrotor aircraft is the Bell/Boeing V-22, which has a pair of three-bladed rotors.

The design of a tiltrotor blade is a compromise between the small and twisted design of an airplane propeller and the large and relatively untwisted design of a helicopter blade. The aerodynamic performance of a tiltrotor blade can be improved if the blade twist can be adjusted to the requirements of the two modes.

Dynamic control of the rotor blade has been achieved with rotor blade actuating systems using a metal joint. However, a metal joint can jam in icy conditions causing an increase in weight on the blade and malfunction of the control system, which can lead to a catastrophic failure.

There is a need for an improved variable twist rotor blade that can be controlled in a variety of atmospheric conditions.

SUMMARY

In a first aspect, there is a rotor blade including a root portion adapted to be connected to a helicopter rotor hub for rotation therewith, the root portion having a first edge surface; a first movable member having a first movable surface adjacent to the first edge surface; a first elastomeric joint disposed between the root portion and the first movable member, the first elastomeric joint having an inner surface facing the first edge surface of the root portion and an outer surface facing the movable surface of the first movable member; and an actuating system mounted within the root portion and the first movable member for moving the first movable member. The first elastomeric joint deforms to adjust for shear from actuation of the first movable member to a first position during helicopter mode; and to a second position during airplane mode.

An embodiment provides that the first edge surface is a trailing edge.

One embodiment provides that the first edge surface is a leading edge.

In yet another embodiment the first edge surface is generally a curved surface configured to fit with the first movable surface of the first movable member.

In an embodiment, the first edge surface is generally a convex surface.

In another embodiment, the first edge surface is generally a concave surface.

In still another embodiment, the inner surface and the outer surface of the first elastomeric joint are generally curved surfaces configured to fit with the first edge surface and the first movable surface.

In yet another embodiment, the first elastomeric joint further includes a shim disposed between the inner surface and the outer surface.

In an embodiment, the first movable member is generally triangular in shape.

In one embodiment, the first movable member is generally rectangular in shape.

In still another embodiment, a control system is provided to control the actuating system by an electronic control system.

An embodiment includes a control system to control the actuating system by centrifugal force.

In one embodiment, the root portion has a leading edge, a trailing edge, and a chordwise axis extending between the leading edge and the trailing edge, the edge surface is a chordwise edge.

In an embodiment, the first movable member further includes a second movable surface.

An embodiment provides a second movable member having a third movable surface, the third movable surface adjacent to the second movable surface of the first movable member; and a second elastomeric joint disposed between the first movable member and the second movable member, the second elastomeric joint having an inner surface facing the second movable surface of the first movable member and an outer surface facing the third movable surface of the second movable member. An embodiment provides that a first elastomeric joint deforms to adjust for shear from actuation of the first movable member to a first position during helicopter mode and to a second position during airplane mode.

In an embodiment, the first movable member in a first position is oriented at an angle of from greater than zero to about 50 degrees relative to a central chordwise axis.

In another embodiment, the first movable member in a first position is oriented at an angle from about −1 to about −50 degrees relative to a central chordwise axis.

In still another embodiment, the first movable member in a second position is oriented at an angle of zero relative to a central chordwise axis.

In a second aspect, there is provided a method to vary the shape of a rotor blade for a tiltrotor aircraft, the method including rotating a rotor blade about a central axis in helicopter mode; actuating a movable member within the rotor blade to a first position during helicopter mode; rotating a rotor blade about a central axis in airplane mode; and actuating the movable member within the rotor blade to a second position during airplane mode.

In an embodiment, the movable member is located on a leading edge of the rotor blade.

In another embodiment, the movable member is located on a trailing edge of the rotor blade.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3A is a top view of a rotor blade with the movable member disposed on the trailing edge of the root section including an actuating system therein, according to one example embodiment;

FIG. 3B is a perspective view of the rotor blade in FIG. 3A showing the movable member in an airplane position:

FIG. 3C is a cross-section view taken along the A-A section lines in FIG. 3A; according to an example embodiment;

FIG. 3D is a cross-section view taken along the A-A section lines in FIG. 3A, according to one example embodiment;

FIG. 4A is a top view of a rotor blade with the movable member disposed on the leading edge of the root portion including an actuation system therein, according to one example embodiment;

FIG. 4B is a perspective view of the rotor blade in FIG. 4A showing the movable member in a helicopter position;

FIG. 4C is an enlarged view of the rotor blade in FIG. 4B;

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
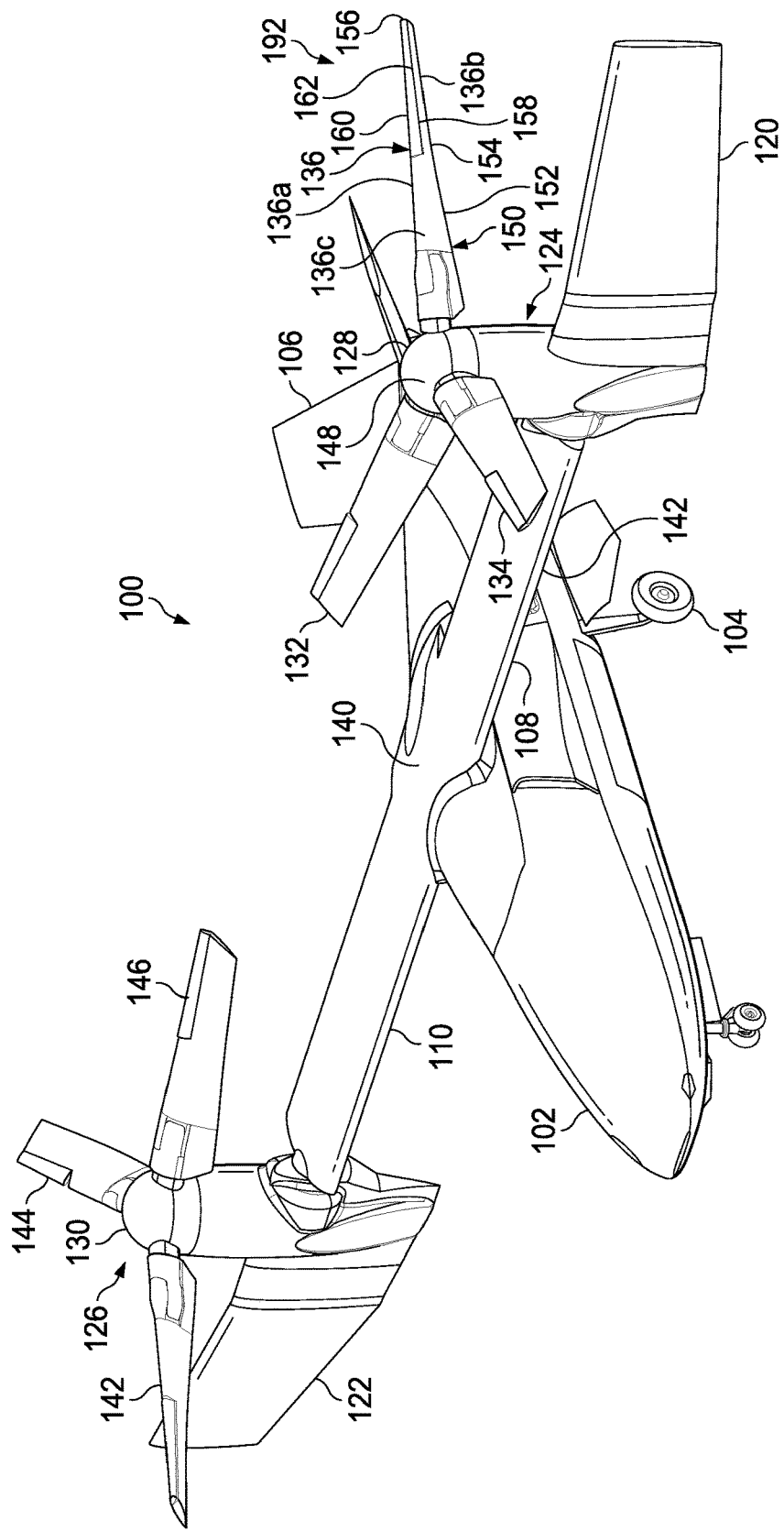
FIG. 1 is a perspective view of a tiltrotor aircraft in helicopter mode, according to one example embodiment.
Figure 2:
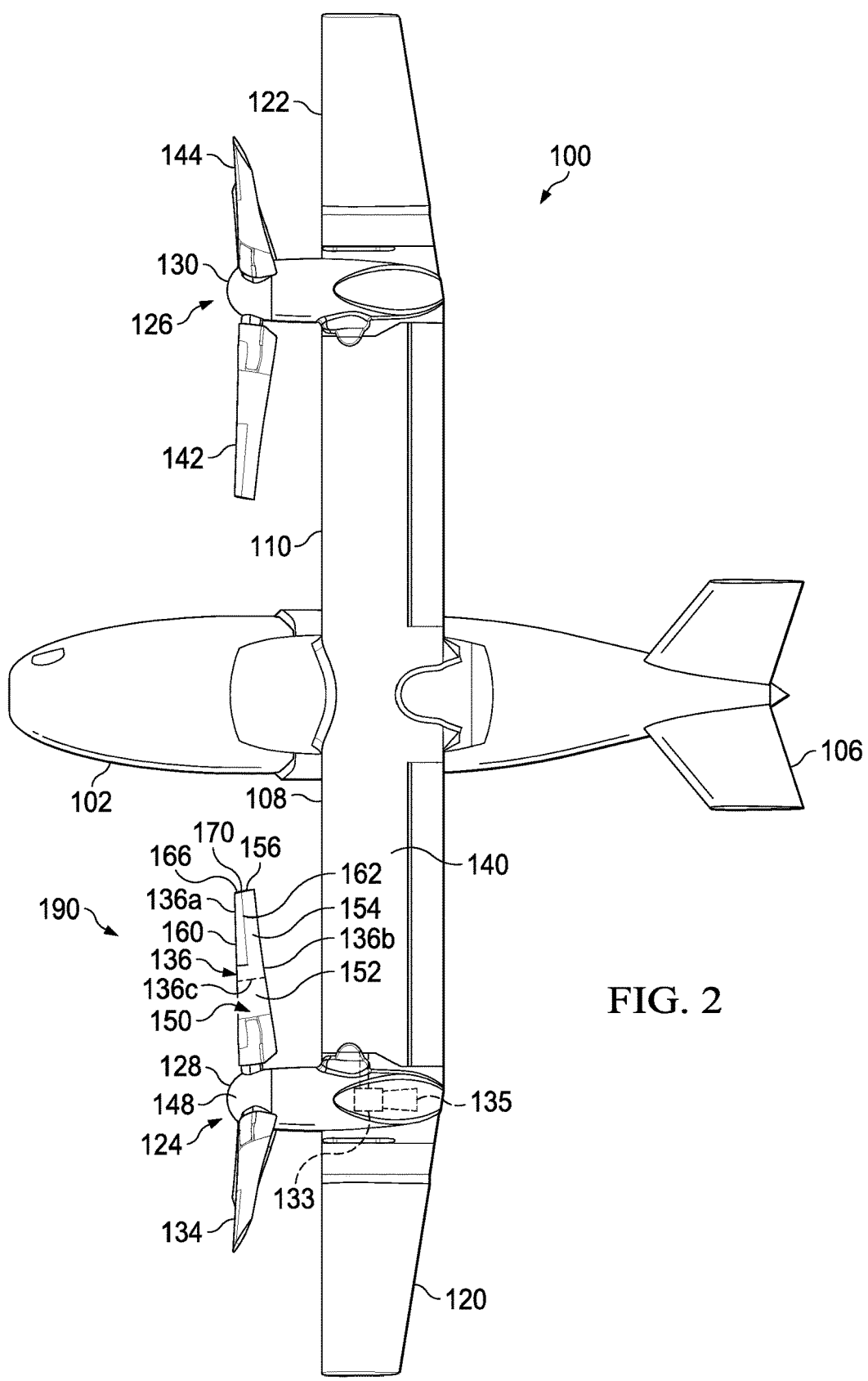
FIG. 2 is a top view of a tiltrotor aircraft in airplane mode, according to one example embodiment.

Referring to FIGS. 1 and 2 in the drawings, a tiltrotor aircraft 100 is illustrated. Tiltrotor aircraft 100 can include a fuselage 102, a landing gear 104, a tail member 106, an inboard wing 108, an inboard wing 110, an outboard wing 120, an outboard wing 122, a propulsion system 124, and a propulsion system 126. Each propulsion system 124 and 126 includes a gearbox 133, an engine 135, and a rotatable rotor system 128, and 130, respectively. Each rotor system 128 and 130 has a plurality of rotor blades 132, 134, and 136; 142, 144, and 146, respectively, associated therewith. The position of the rotor system 128 and 130 can be selectively controlled in order to selectively control direction, thrust, and lift of the tiltrotor aircraft 100.

FIG. 1 illustrates tiltrotor aircraft 100 in helicopter mode, in which the rotor systems 128 and 130 are positioned substantially vertical to provide a lifting thrust. FIG. 2 illustrates tiltrotor aircraft 100 in an airplane mode, in which rotor systems 128 and 330 are positioned substantially horizontal to provide a forward thrust in which a lifting force is supplied by inboard wings 108 and 110, respectively. The outboard wings 120 and 122 shown in FIGS. 1 and 2 are each positioned vertically or horizontally with the rotor systems 128 and 130, respectively, increase the wing span and wing aspect ratio, which thereby increases lift/draft ratio and aircraft efficiency and fuel economy as compared to a tiltrotor without outboard wings 120 and 122. It should be appreciated that tiltrotor aircraft can be operated such that rotor systems 128 and 130 are selectively positioned between airplane mode and helicopter mode, which can be referred to as a conversion mode.

The rotor blades 132, 134, 136, 142, 144, and 146 are substantially symmetric; therefore, for sake of efficiency the rotor blades will be disclosed only with regard to rotor blade 136. However, one of ordinary skill in the art would fully appreciate an understanding of the rotor blades 132, 134, 142, 144, and 146 based upon the disclosure herein of the rotor blade 136.

Further, the rotor blade 136 is illustrated in the context of tiltrotor aircraft 100; however, at least one embodiment of the rotor blade can be implemented in devices with propellers, rotors, windmills, and wind turbines that operate over a wide range of power settings and speeds, where varying the twist distribution of the blade improves performance of the blade.

Rotor blade 136 includes a root portion 150, which attaches in a conventional manner to hub 148. The root portion 150 has an inboard portion 152; an outboard portion 154, which ends at blade tip 156; and a first edge surface 158. The rotor blade 136 has a leading edge 136a and a trailing edge 136b, which define the chordwise axis 136c.

Rotor blade 136 includes a first movable member 160; a first elastomeric joint 170 located between the root portion 150 and the first movable member 160; and an actuating system. The twist of the rotor blade 136 is controlled by actuating the first movable member 160 to achieve a twist distribution for a flight mode. By modifying the twist of the rotor blade 136 for a particular flight mode, performance of the blade 136 is improved, which increases aircraft 100 fuel efficiency, range, and payload. In one embodiment, the first movable member 160 is actuated by the actuating system to either angle upwards in a twisted first position 190 while in airplane mode or deflect downwards in an untwisted second position 192 while in helicopter mode.

It is contemplated that the first movable member 160 could come in a variety of shapes and sizes and extends from an upper surface to a lower surface of the rotor blade 136. The first movable member 160 is shown in FIGS. 1 and 2 as generally rectangular in shape from a top view. In other embodiments, the first movable member 160 is generally cubical or triangular in shape. The first movable member 160 can be a shape suitable to achieve a desired twist distribution for a desired flight mode.

It is further contemplated that the first movable member 160 can be located within the perimeter of blade 136 and forms part of the air-foil shaped body of the blade 136. The first movable member 160 is shown located on the leading edge 136a. In other embodiments, the first movable member 160 is located on at least one of the following: the trailing edge 136b and a chordwise edge 136c of the blade 136. For example, the first movable member 160 extends longitudinally within the blade 136 from about ⅕ to about ½ the distance of the chordwise axis 136c. The first movable member 160 can be adjacent to the outboard portion 154 of the root portion 150. In one embodiment, the first movable member 160 has an outboard end 166 aligned with the blade tip 156.

In another embodiment, the first movable member 160 has an outboard end 166 within the blade 136 so as not to be aligned with the blade tip 156.

In other embodiments, the first movable member 160 extends chordwise along the entire distance of the chordwise axis 136c. The first movable member 160 can be adjacent to the inboard portion 152 of the root portion 150.

In some embodiments, at least a portion of the first movable member 160 extends beyond the perimeter of blade 136.

The first movable member 160 can be manufactured of materials similar to the root portion 150. In yet other embodiments, the first movable member 160 is manufactured using materials different from the root portion 150.

The first elastomeric joint 170 deforms to adjust for shear during actuation of the first movable member 160. The first elastomeric joint 170 connects the first movable member 160 to the root portion 150 of the blade 136 and limits the range of motion of the movable member 160. The first elastomeric joint 170 is located between and extends the entire length of the first edge surface 158 of the root portion 150 and a first movable surface 162 on the first movable member 160. The first elastomeric joint 170 is configured such that there is continuity between the first edge surface 158 and the first movable member surface 162 and no gap exists therebetween when the movable member 160 is in either a first position 192 or a second position 190. In one embodiment, the first edge surface 158 and the first movable surface 162 are generally parallel to the leading edge 136a. In another embodiment, the first edge surface 158 and the first movable surface 162 are generally parallel to the trailing edge 136c. An embodiment provides that the first edge surface 158 and the first movable surface 162 are generally parallel to the chordwise axis 136c.

The first elastomeric joint 170 can avoid any ice jamming that may occur in non-elastomeric joints. In one embodiment, the elastomeric joint 170 can be configured to warp and hold loads in compression while allowing motion and shear. The elastomeric joint 170 may be constructed of any elastomeric material that receives movement between two surfaces and can deform under shear. As shear stress increases, the elastomeric joint 170 can bulge transversely relative to the direction of the shear stress, which distributes the shear stress. In one embodiment, the elastomeric joint is configured to allow from zero to about 3 degrees of movement at an angle A relative to a central chordwise axis. In an embodiment, the elastomeric joint 170 is configured to permit only minimal movement of the movable member 160 therein.

The movement of the first movable member 160 can be controlled autonomously or actively by the actuating system. In one embodiment, the actuating system reacts to centrifugal forces acting on the blade 136 as the blade 136 spins around the hub 148. For example, once centrifugal forces acting on the blade 136 reach a determined level in helicopter mode, the actuating system is engaged to move the first movable member 160 to the first position 192 so the blade 136 is less twisted. When the centrifugal forces acting on the blade 136 decrease, the actuating system is disengaged which moves the first movable member 160 to the second position 190 such that the blade 136 is twisted for airplane mode.

FIGS. 3A-3I illustrate an exemplary embodiment of the rotor blade 136. Certain components of the rotor blade 136 are as described above and bear similar reference characters, but with a leading '2' rather than a leading '1'. The rotor blade 236 includes a root portion 250, a first movable member 260, a first elastomeric joint 270, and an actuating system 280. The first movable member 260 is located on the trailing edge 236b and is pivotably engaged at the first edge surface 258 to the root portion 250. The first movable member 260 is located adjacent to the outboard portion 254 of the root portion 250. The movable member 260 is generally triangular in shape. The movable member 260 extends from an upper surface 237a to a lower surface 237b on the rotor blade 236.

The rotor blade 236 includes a first blade portion 251 and a second blade portion 253, which leads to the root portion 250. The first and second blade portions 251 and 253 are each angled airfoil sections connecting the rotor blade 236 to the hub 148. The root portion 250 includes a first edge surface 258 that receives the first elastomeric joint 270 and the movable member 260 thereon.

Referring now to FIGS. 3C and 3D, in one embodiment, the first edge surface 258 is a substantially-curved surface, which accepts a generally complimentary curved surface on the first elastomeric joint 270 and the first movable member 260. FIG. 3C is an exemplary embodiment of the first edge surface 258 having a substantially-convex surface. In another embodiment, as shown in FIG. 3D, the first edge surface 258 has a substantially-concave surface. The first elastomeric joint 270 and the first movable surface 262 each includes a substantially-curved surface complimentary to the first edge surface 258. In one embodiment, the first elastomeric joint 270 and first edge surface 258 each includes a surface parallel to the first edge surface 258.

Referring now to FIG. 3C in the drawings, the various components of the elastomeric joint 270 are depicted. The first elastomeric joint 270 is located between the edge surface 258 and a first movable surface 262. In one embodiment, the first elastomeric joint 270 spans the space between the edge surface 258 and the first movable surface 262. In other embodiments, the elastomeric joint 270 is disposed at least in part of the space between the edge surface 258 and the first movable surface 262. The first elastomeric joint 270 has an inner surface 272 facing the first edge surface 258 of the root potion 250 and an outer surface 274 facing the movable surface 262 of the first movable member 260.

The elastomeric joint 270 can include at least two elastomeric members 276a and 276b. The elastomeric members 276a and 276b can each be an elastomeric insert, layer, or sheet made from a material that has properties selected to suit the specific requirements for stiffness, strength, and durability, for example, but not limitation, natural rubber, synthetic rubber blends, an elastomer, polymer, and combinations thereof. Each member 276a and 276b can have a constant thickness. Elastomeric members 276a and 276b generally have a low Young's modulus and a high yield strain when compared to other materials.

The elastomeric joint 270 can include a shim 278a located between the two members 276a and 276b. The shim 278a can be made of any desired rigid material; for example, from a material selected from aluminum, steel, titanium, fiberglass, graphite, and a composite. The shim 278a can be tapered such that a narrow portion is located toward the outer portion of the elastomeric joint 270. In another embodiment, as shown in FIG. 3D, at least two shims 278a and 278b can be provided between the elastomeric members 276a, 276b, and 276c.

The elastomeric joint 270 is tailored to a type of movement and a desired load by adjusting the elastomeric members 276a, 276b, and 276c and shims 278a and 278b. The thickness and viscoelasticity along with other physical and mechanical properties of the elastomeric members 276a, 276b, and 276c can be tailored for the elastomeric joint 270. The number of elastomeric members 276a, 276b, and 276c and shims 278a and 278b can be increased or adjusted for the movement and load needed to move the movable member 260.

In an exemplary embodiment, as the number of elastomeric members 276a, 276b, and 276c is increased to more than three members, the thickness of each member is decreased. A shim 278a is located between each of the thin elastomeric members. The elastomeric joint 270 of this exemplary embodiment results in a more controlled movement and less bulge by each elastomeric member therein to provide a stiffer off-axis motion as compared to an elastomeric joint having, three layers or less of the elastomeric members 276a, 276b, and 276c and shims 278a and 278b.

As fully constructed, the elastomeric joint 270 can be a unitary structure composed of the above described components adhered, bonded, bolted, or otherwise secured to the first edge surface 258 and the movable surface 262. In one embodiment, the elastomeric joint 270 is vulcanized to the first edge surface 258 and the movable surface 262. While elastomeric members 276a, 276b, and 276c are described above as discrete pieces, they can be produced by a vulcanization process whereby the elastomeric members 276a, 276b, and 276c and the shims 278a and 278b are spatially arranged and vulcanized to ensure that the elastomeric members 276a, 276b, and 276c and the shims 278a and 278b adhere together to form a unitary structure.

The geometry and the materials of the elastomeric joint 270 are configured to deform to adjust for shear load during actuation of the first movable member 260 such that the elastomeric members 276a, 276b, and 276c bulge transversely relative to the direction of the shear stress to distribute the shear stress and mutually support each other. In an embodiment, the elastomeric joint 270 is deformed to adjust for shear and imparts movement on the movable member 260 such that it reaches up to a maximum 100 percent tensile strain in the elastomeric members 276a, 276b, and 276c.

The elastomeric joint 270 provides a warping surface when the movable member 260 is actuated into a position by the actuating system 280. In one embodiment, the movable member 260 is configured to allow a pivoting movement at an angle A from 0 degrees to about 50 degrees relative to a central chordwise axis 236d for a flight mode. The central chordwise axis 236 is oriented at 0 degrees. In an exemplary embodiment, the movable member 260 is configured to allow a pivoting movement at the angle A from greater than zero degrees to about 25 degrees relative to the central chordwise axis 236d for a flight mode. In another exemplary embodiment, the movable member 260 is configured to allow a pivoting movement at the angle A from greater than 1 degree to about 22 degrees relative to the central chordwise axis 236d.

In an embodiment, the movable member 260 is configured to allow a pivoting movement at an angle A from 0 degrees to about −50 degrees relative to a central chordwise axis 236d for a flight mode. In an exemplary embodiment, the movable member 260 is configured to allow a pivoting movement at the angle A from −1 degree to about −25 degrees relative to the central chordwise axis 236d for a flight mode. In another exemplary embodiment, the movable member 260 is configured to allow a pivoting movement at the angle A from −1 degree to about −22 degrees relative to the central chordwise axis 236d.

In an embodiment, the movable member 260 pivots solely to achieve a twist distribution for a helicopter or an airplane flight mode. Adjusting the movable member 260 to modify the twist distribution of the blade 236 increases flight performance of the blade 236 during different flight modes.

Figure 3E:
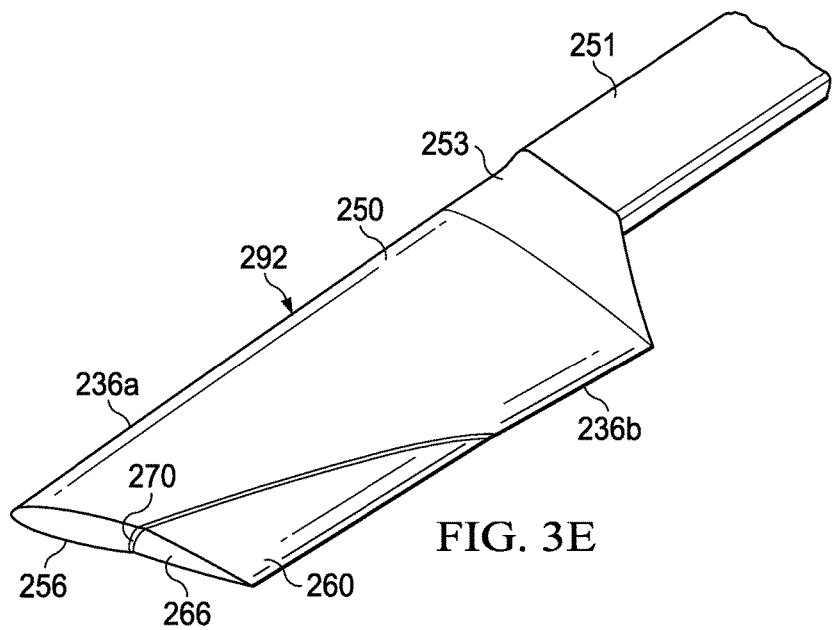
FIG. 3E is a perspective view of the rotor blade in FIG. 3A showing the movable member in a helicopter position.
Figure 3F:
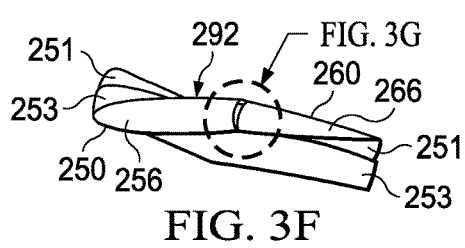
FIG. 3F is a side view of the rotor blade in FIG. 3E.
Figure 3H:
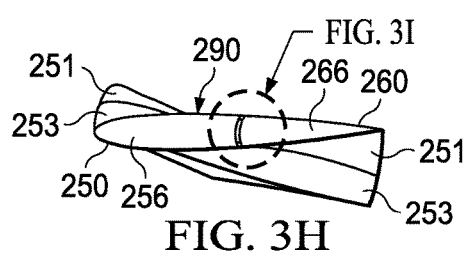
FIG. 3H is a side view of the rotor blade in FIG. 3B.
Figure 3G:
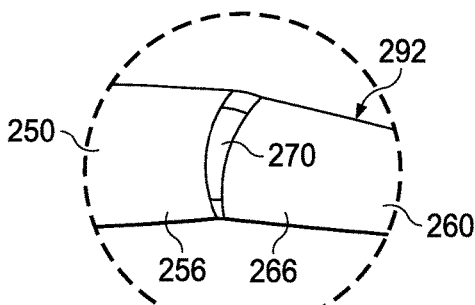
FIG. 3G is an enlarged view of the rotor blade in in FIG. 3F.

FIGS. 3E, 3F, and 3G illustrate the movable member 260 in a first position 292 for helicopter mode where the blade is in a less twisted position as compared to the second position 290. FIGS. 3E and 3F are side views showing the profile of the rotor blade 236 in the first position 292. The movable member 260 is deflected downward when in first position 292 to create a flatter, less twisted blade 236 to improve aerodynamic performance in helicopter mode.

Figure 3I:
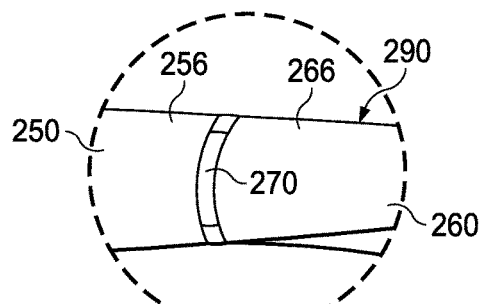
FIG. 3I is an enlarged view of the rotor blade in FIG. 3H.

FIGS. 3B, 3H, and 3I illustrate the movable member 260 in a second position 290 for airplane mode where angle A is at zero degrees so that the blade is in a maximum twisted position. FIGS. 3H and 3I are side views showing the twisted profile of the rotor blade 236 in the second position 290. The movable member 260 is extended in an upward twist at angle A when in second position 290 to improve aerodynamic performance when in airplane mode.

In the contemplated embodiment, the movement of the movable member 260 can be controlled autonomously or controlled with a computer control system 288. For example, the movable member 260 can be controlled by an actuating system 280 and a control system 288. The actuating system 280 includes an inboard shaft 282, a gear 284, and an outboard shaft 286. The actuating system 280 can be controlled electromechanically to allow the blade 236 to vary its shape via the movable member 260. The actuating system 280 can be connected to and controlled by a computer control system 288.

In one exemplary embodiment, the inboard shaft 282 is mounted spanwise within the first blade portion 251, second blade portion 253, and the root portion 250 and is connected to the gear 284 on an outboard end. The outboard shaft 286 is connected to gear 284 at an inboard end.

The outboard shaft 286 has a shared axis with the root portion 250 and the movable member 260. When inboard shaft 282 is turned, the rotary motion of the inboard shaft 282 is imparted onto gear 284 which rotates shaft 286 to adjust the angle of the movable member 260, thus changing the overall shape of the rotor blade 236. Shaft 286 can be rigidly attached and extend to the movable member 260 via arm 287, which extends to the trailing edge 236*b*.

In one embodiment, the actuation system 280 provides a slow rate of movement to move the movable member 260 to a first or second position. For example, the movable member 260 is actuated over a time greater than one rotation about the hub 148.

FIGS. 4A-4E show an example of the rotor blade 236. Certain components of the rotor blade 236 are as described above and bear similar reference characters, but with a leading '3' rather than a leading '2'. The rotor blade 336 includes a root portion 350, a first movable member 360, a first elastomeric joint 370, and an actuating system 380. The first movable member 360 is located on the leading edge 336*a* and is pivotably engaged at the first edge surface 358 to the root portion 350.

The elastomeric joint 370 provides a warping surface when the movable member 360 is actuated into a position by the actuating system 380. For example, the movable member 360 is configured to allow a pivoting movement at an angle A' from about 0 to about −30 degrees relative to a central chordwise axis 336*d*.

FIGS. 4B-4C illustrate an exemplary embodiment showing the movable member 360 in a flat, less twisted orientation in a first position 392 for helicopter mode. The movable member 360 is deflected upwards on the leading edge 336*a* to achieve a twist distribution on the blade 336 to improve aerodynamic performance during helicopter mode.

Figure 4D:
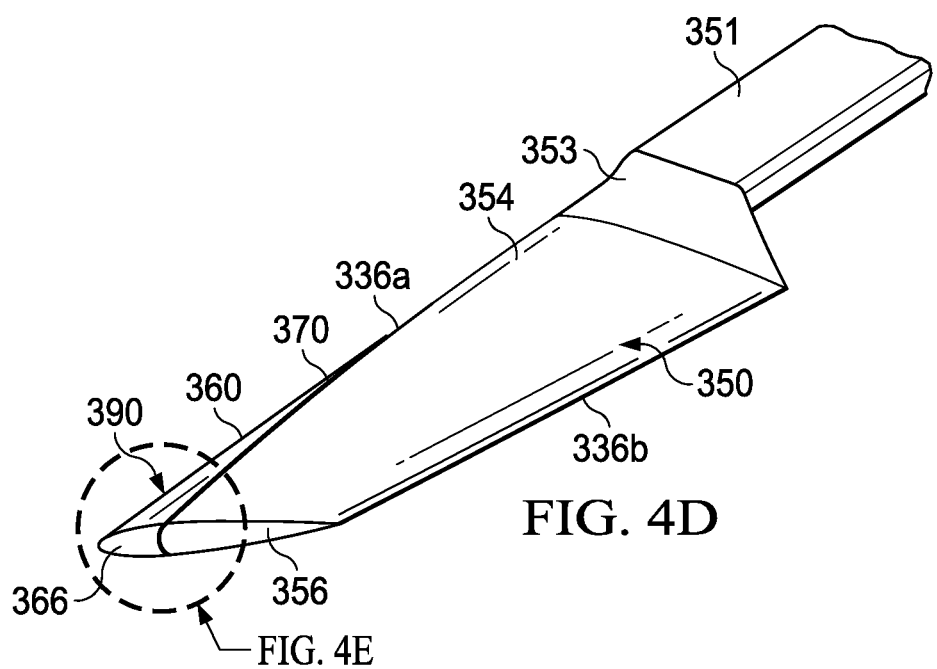
FIG. 4D is a perspective view of the rotor blade in FIG. 4A showing the movable member in an airplane position.
Figure 4E:
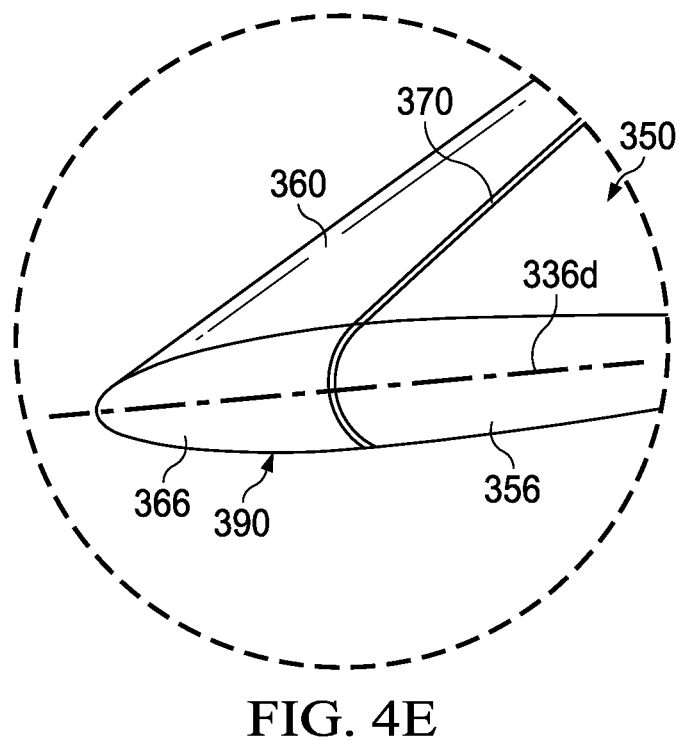
FIG. 4E is an enlarged view of the rotor blade in FIG. 4D.

FIGS. 4D-4E illustrate the movable member 360 in a second position 390 where angle A' is at zero degrees so the blade 363 is in a maximum twisted position for airplane mode to improve aerodynamic performance.

The actuating system 380 includes an inboard shaft 382, a cam 384, and outboard shaft 386. The outboard shaft 386 has a shared axis with the root portion 350 and the movable member 360. When inboard shaft 382 is turned, the rotary motion of the inboard shaft 382 is imparted onto the cam 384 which rotates shaft 386 to adjust the angle of the movable member 260 accordingly, thus changing the overall shape of the rotor blade 336.

Figure 5:
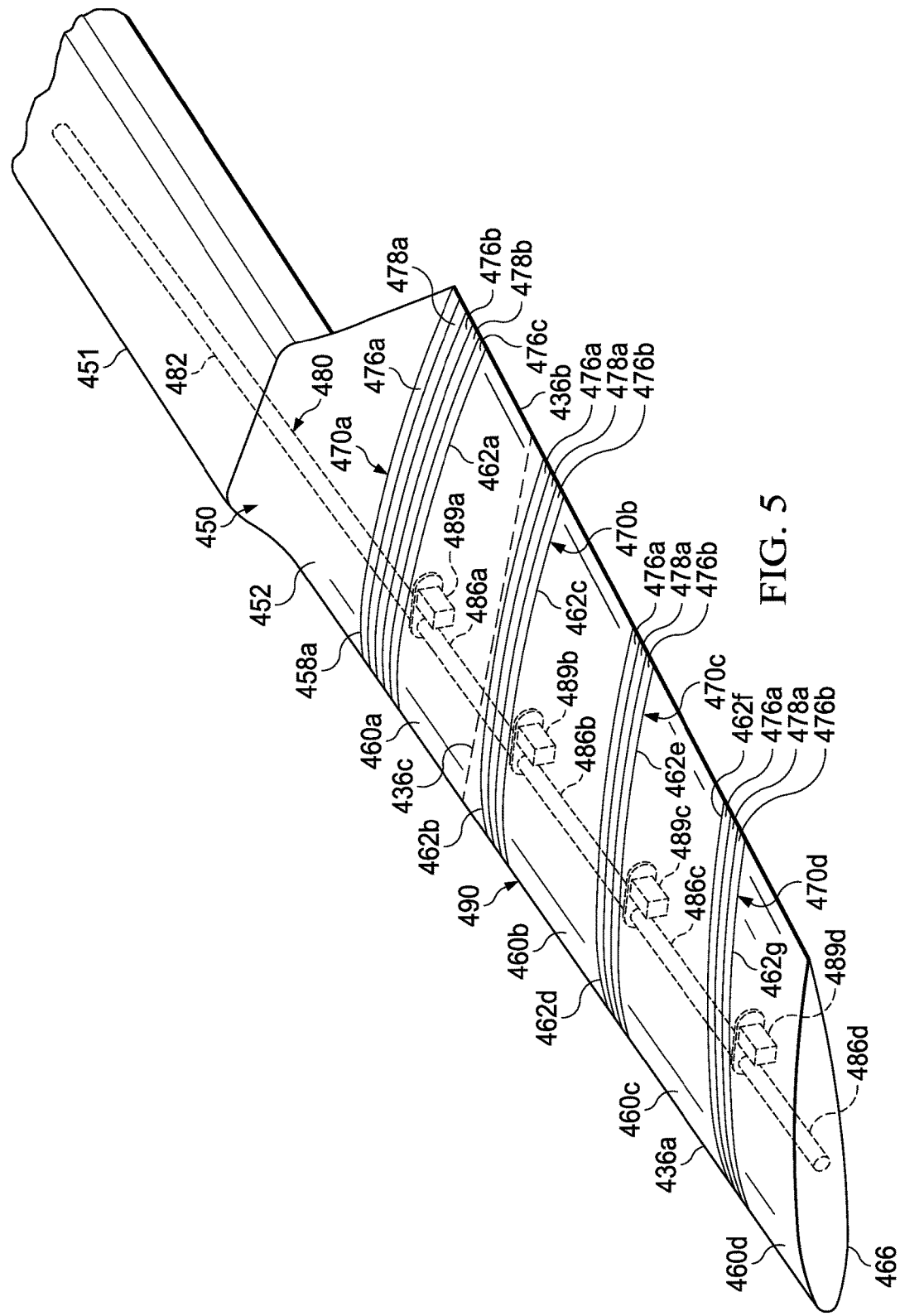
FIG. 5 is a perspective view of a rotor blade with a plurality of movable members including an actuation system therein, according to one example embodiment.
Figure 6:
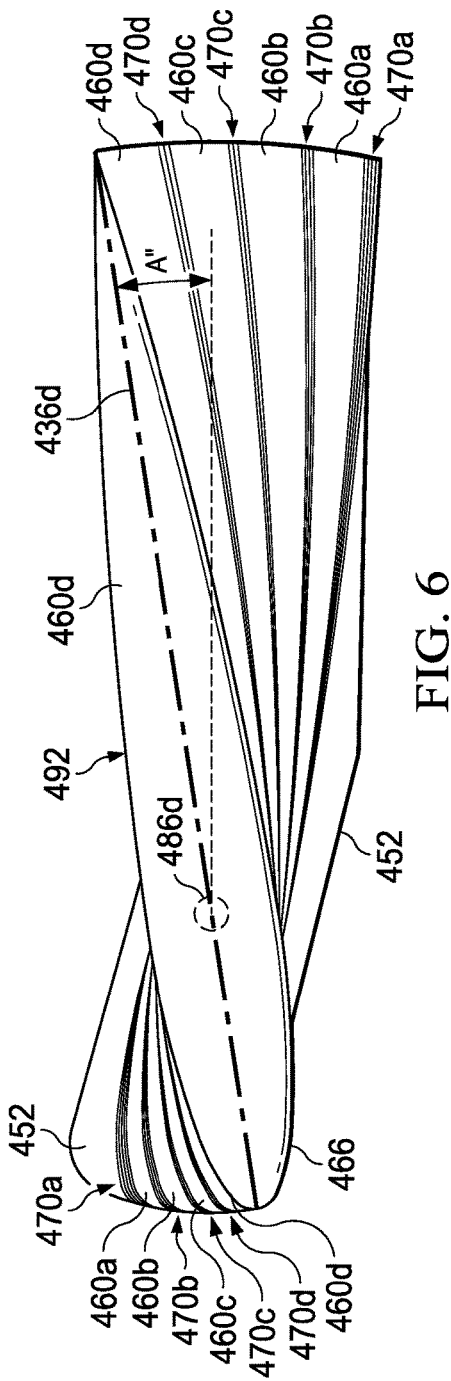
FIG. 6 is a side view of the rotor blade in FIG. 5 showing the movable member in airplane mode.
Figure 7:
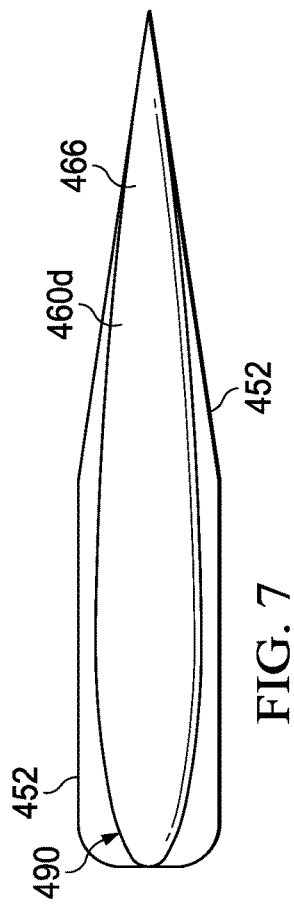
FIG. 7 is a side view of the rotor blade in FIG. 5 showing the movable member in helicopter mode.

FIGS. 5-7 show an example of the rotor blade 236. Certain components of the rotor blade 236 are as described above and bear similar reference characters, but with a leading '4' rather than a leading '2'. The rotor blade 436 includes a root portion 450, a first movable member 460*a*, a second movable member 460*b*, a third movable member 460*c* and a fourth movable member 460*d*. The rotor blade 436 is illustrated herein with four movable members 460*a*, 460*b*, 460*c*, and 460*d*; however, the disclosure is not limited to four movable members, rather even more movable members such as, but not limited to, five, six, seven, eight, nine, ten and more than ten can also be implemented.

The rotor blade 436 is illustrated herein with the four movable members 460*a*, 460*b*, 460*c*, and 460*d* oriented generally parallel to a chordwise axis 436*c*. An embodiment envisions orienting at least one movable member generally parallel to a longitudinal axis of the rotor blade, e.g., generally parallel to the leading edge 436*a* or the trailing edge 436*b*, and at least one movable member generally parallel to the chordwise axis 436*c*.

The first movable member 460*a* is located on inboard portion 452 of the blade 436 and is pivotably engaged at the first edge surface 458*a* thereto as described above. When viewed from a top or bottom view, the first, second, third, and fourth movable members 460*a*, 460*b*, 460*c* and 406*d* are each generally rectangular in shape.

A first elastomeric joint is located between the root portion 450 and the first movable member 460*a*. Second, third, and fourth elastomeric joints 470*b*, 470*c*, and 470*d* are each located between each of the first, second, third, and fourth movable members 460*a*, 460*b*, 460*c*, and 460*d*, respectively.

The first movable member 460*a* includes a first movable surface 462*a* connected to the first elastomeric joint 470*a* and a second movable surface 462*b*.

The second movable member 460*b* includes a third movable surface 462*c* connected to the second elastomeric joint 470*b* and a fourth movable surface 462*d*.

The third movable member 460*c* includes a fifth movable surface 462*e* connected the third elastomeric joint 470*c* and a sixth movable surface 462*f*.

The fourth movable member 460*d* includes a seventh movable surface 462*g* connected to the fourth elastomeric joint and the fifth movable surface 462*f*. The fourth movable member has an end surface 466 that forms the blade tip.

In one embodiment, each of the first, second, third, fourth, fifth, sixth, and seventh movable surfaces 460*a-g* is a substantially-curved surface having a convex or a concave profile. The first, second, third and fourth elastomeric joints 470*a-d* can also have a substantially-curved surface that is complimentary to the respective movable member surface.

Each of the elastomeric joints 470*a-d* provides a warping surface when the movable members 470*a-d* are actuated into a position by the actuating system 480. Each of the movable members 470*a-d* is configured to allow a pivoting movement at an angle A" from about 0 to about 50 degrees relative to a central chordwise axis 436*d*. In an embodiment, each of the movable members 470*a-d* is configured to allow a pivoting movement at an angle A" from greater than 0 to about 25 degrees relative to a central chordwise axis 436*d*. In an embodiment, each of the movable members 470*a-d* is configured to allow a pivoting movement at an angle A" from greater than 0 to about 22 degrees relative to a central chordwise axis 436*d*.

In an embodiment, each of the movable members 470*a-d* is configured to allow a pivoting movement at an angle A" from about −1 degree to about −50 degrees relative to a central chordwise axis 436*d*. In an embodiment, each of the movable members 470*a-d* is configured to allow a pivoting movement at an angle A" from about −1 degree to about −25 degrees relative to a central chordwise axis 436*d*. In an embodiment, each of the movable members 470*a-d* is configured to allow a pivoting movement at an angle A" from about −1 to about −22 degrees relative to a central chordwise axis 436*d*.

FIG. 6 illustrates the movable members 470*a-d* in a first position 492 for airplane mode where angle A" is at zero degrees so that the 436 blade is in a maximum twisted position.

FIG. 7 illustrates the movable members 470*a-d* in a second position 490 for helicopter mode where so that the blade is in a less twisted position as compared to the first position 492.

In the contemplated embodiment, the first, second, third, and fourth movable members 470*a*, 470*b*, 470*c*, and 470*d* can be controlled by an actuating system 480. The actuating system 480 includes an inboard shaft 482; a plurality of cams attached to a schematic representation of an actuator 489*a*, 489*b*, 489*c*, and 489*d*; and a plurality of outboard shafts 486*a*, 486*b*, 486*c*, and 486*d* in a series. When inboard shaft 482 is turned, the rotary motion of the inboard shaft 482 is imparted onto the respective cam and actuator 489*a*, 489*b*, 489*c*, and 489*d*; which rotates the adjacent outboard shaft to adjust the angle of the first, second, third, and fourth movable members 470a, 470b, 470c, and 470d to change the overall shape of the rotor blade 436.

The rotor blade 436 is illustrated herein with four movable members 460a, 460b, 460c, and 460d that are each actuated to achieve the second position 490; however, the disclosure is not limited thereto. In another embodiment, at least two, three, four, five, six, or more of the movable members are pivoted into a position to improve aerodynamic performance for a flight mode. The pivoting of a movable member 460a, 460b, 460c, or 406d is achieved by the respective cam with actuator 489a, 489b, 489c, or 489d. The cams with the actuators 489, 489b, 489c and 489d can each be configured to operate independently from one another to obtain a desired twist profile for the blade 436.

The illustrative embodiments of the rotor blade having variable twist described herein can advantageously provide improved aerodynamic performance of the rotor blade while operating at different flight modes and can operate in a variety of atmospheric conditions.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A rotor blade comprising:
    a root portion adapted to be connected to a helicopter rotor hub for rotation therewith, the root portion having a first edge surface;
    a first movable member having a first movable surface adjacent to the first edge surface;
    a first elastomeric joint disposed between the root portion and the first movable member, the first elastomeric joint having an inner surface facing the first edge surface of the root portion and an outer surface facing the movable surface of the first movable member; and
    an actuating system mounted within the root portion and the first movable member for moving the first movable member;
    wherein the first elastomeric joint deforms to adjust for shear from actuation of the first movable member to a first position during helicopter mode and to a second position during airplane mode.

2. The rotor blade of claim 1, wherein the first edge surface is a trailing edge.

3. The rotor blade of claim 1, wherein the first edge surface is a leading edge.

4. The rotor blade of claim 1, wherein the first edge surface is generally a curved surface configured to fit with the first movable surface of the first movable member.

5. The rotor blade of claim 4, wherein the first edge surface is generally a convex surface.

6. The rotor blade of claim 4, wherein the first edge surface is generally a concave surface.

7. The rotor blade of claim 4, wherein the inner surface and the outer surface of the first elastomeric joint are generally curved surfaces configured to fit with the first edge surface and the first movable surface.

8. The rotor blade of claim 1, wherein the first elastomeric joint further comprises a shim disposed between the inner surface and the outer surface.

9. The rotor blade of claim 1, wherein the first movable member is generally triangular in shape.

10. The rotor blade of claim 1, wherein the first movable member is generally rectangular in shape.

11. The rotor blade of claim 1, further comprising a control system to control the actuating system by an electronic control system.

12. The rotor blade of claim 1, further comprising a control system to control the actuating system by centrifugal force.

13. The rotor blade of claim 1, wherein the root portion has a leading edge, a trailing edge, and a chordwise axis extending between the leading edge and the trailing edge, the first edge surface is a chordwise edge.

14. The rotor blade of claim 13, wherein the first movable member further comprises a second movable surface.

15. The rotor blade of claim 14, further comprising:
    a second movable member having a third movable surface, the third movable surface adjacent to the second movable surface of the first movable member; and
    a second elastomeric joint disposed between the first movable member and the second movable member, the second elastomeric joint having an inner surface facing the second movable surface of the first movable member and an outer surface facing the third movable surface of the second movable member.

16. The rotor blade of claim 1, wherein the first movable member in a first position is oriented at an angle of from greater than zero to about 50 degrees relative to a central chordwise axis.

17. The rotor blade of claim 1, wherein the first movable member in a first position is oriented at an angle from about −1 to about −50 degrees relative to a central chordwise axis.

18. The rotor blade of claim 1, wherein the first movable member in a second position is oriented at an angle of zero relative to a central chordwise axis.

19. A method to vary the shape of a rotor blade for a tiltrotor aircraft, the method comprising:

rotating a rotor blade about a central axis in helicopter mode;
actuating a movable member within the rotor blade to a first position during helicopter mode;
rotating a rotor blade about a central axis in airplane mode; and
actuating the movable member within the rotor blade to a second position during airplane mode;
wherein an elastomeric joint adjacent to the movable member deforms to adjust for shear from actuation of the movable member to a first position during helicopter mode and to a second position during airplane mode.

20. The method of claim 19, wherein the movable member is located on a leading edge of the rotor blade.

21. The method of claim 19, wherein the movable member is located on a trailing edge of the rotor blade.

\* \* \* \* \*